United States Patent
Huber et al.

(10) Patent No.: US 8,997,311 B2
(45) Date of Patent: Apr. 7, 2015

(54) VACUUM CLEANER WITH A TEMPERATURE-CONTROLLED BATTERY

(75) Inventors: Franz Huber, Markt Wald (DE); Bernd Ziegler, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 336 days.

(21) Appl. No.: 13/334,560

(22) Filed: Dec. 22, 2011

(65) Prior Publication Data

US 2012/0159736 A1 Jun. 28, 2012

(30) Foreign Application Priority Data

Dec. 23, 2010 (DE) .......................... 10 2010 064 026

(51) Int. Cl.
| | | |
|---|---|---|
| A47L 9/22 | (2006.01) | |
| A47L 9/28 | (2006.01) | |
| A47L 9/00 | (2006.01) | |
| H01M 2/10 | (2006.01) | |
| H01M 10/613 | (2014.01) | |
| H01M 10/615 | (2014.01) | |
| H01M 10/6563 | (2014.01) | |

(52) U.S. Cl.
CPC .............. *A47L 9/2884* (2013.01); *A47L 9/00* (2013.01); *A47L 9/2889* (2013.01); *H01M 2/1055* (2013.01); *H01M 10/5004* (2013.01); *H01M 10/5006* (2013.01); *H01M 10/5067* (2013.01); *Y10S 15/01* (2013.01)

(58) Field of Classification Search
USPC .............................................. 15/413, DIG. 1
IPC .......................................................... A47L 9/22
See application file for complete search history.

(56) References Cited

U.S. PATENT DOCUMENTS

| | | | |
|---|---|---|---|
| 6,967,464 B2 | 11/2005 | Heigl et al. | 320/107 |
| 7,979,954 B2 * | 7/2011 | Moore et al. | 15/323 |
| 2003/0134189 A1 | 7/2003 | Kanai et al. | 429/156 |
| 2003/0182758 A1 | 10/2003 | Hisano et al. | 15/412 |

FOREIGN PATENT DOCUMENTS

| | | |
|---|---|---|
| EP | 1 381 134 A1 | 1/2004 |
| EP | 1 178 557 B1 | 5/2004 |
| EP | 1 419 723 B1 | 5/2004 |
| JP | 2002 065 535 | 3/2002 |
| WO | WO 00/36969 | 6/2000 |
| WO | WO 2004/041050 | 5/2004 |

* cited by examiner

*Primary Examiner* — David Redding
(74) *Attorney, Agent, or Firm* — Davidson, Davidson & Kappel, LLC

(57) ABSTRACT

A vacuum cleaner (1) having a housing (2, 2') and at least one battery (4) arranged therein, and/or at least one battery compartment (3) that serves to hold at least one battery (4). The vacuum cleaner (1) has a vacuum generator (5) that serves to generate an air stream along a flow path (A), wherein the at least one battery (4) or the at least one battery compartment (3) is arranged in said flow path (A).

9 Claims, 2 Drawing Sheets

VACUUM CLEANER WITH A TEMPERATURE-CONTROLLED BATTERY

This claims the benefit of German Patent Application DE 10 2010 064 026.3, filed Dec. 23, 2010 and hereby incorporated by reference herein.

The invention relates to a vacuum cleaner having a housing and at least one battery arranged therein, and/or at least one battery compartment that serves to hold at least one battery.

BACKGROUND

Owing to the steadily increasing output of mobile, electrically operated devices, the requirements made of the batteries employed, which are also sometimes referred to as accumulators, are also on the rise. The currents, which in some cases are high during the charging and discharging of the batteries, cause the batteries to heat up considerably. This is why batteries according to the state of the art are often cooled during operation.

For instance, European patent specification EP 1 178 557 B1 discloses a cordless electric power tool having a housing, a removable battery and a battery charger for charging the battery. The battery has a housing with one or more cells and a ventilation system that allows air to flow around the cells. The battery charger has a fan that generates the above-mentioned air flow. Finally, the electric tool comprises a heat pump for cooling or warming up the battery cells.

Furthermore, European patent application EP 1 381 134 A1 discloses a charging station for a rechargeable battery that can be electrically and structurally connected to the station. This charging station comprises an electric and structural contact interface for the battery as well as charging electronics in a charger housing. An air blower that serves to generate an air stream through two ventilation openings is arranged in the charger housing, whereby a ventilation opening of the contact interface is structurally associated with the battery and the charging electronics are arranged in the air stream so that their heat is dissipated. In a first method step during the cooling process, a volume of air at a cooling temperature is moved past the battery and, in a second method step, the volume of air at an intermediate temperature passes through the charger housing containing the charging electronics.

Finally, European patent specification EP 1 419 723 B1 discloses a vacuum cleaner that has several battery docks that can be used in the cited vacuum cleaner as well as in other handheld electric tools. The vacuum cleaner can be operated connected to the mains or else it can be autonomously powered by the batteries.

SUMMARY OF THE INVENTION

A drawback of the prior-art systems is that the operation of a battery-operated device calls for a separate charging station with integrated cooling in order to charge the battery. On the one hand, this raises the production costs of battery-operated devices since, as a rule, a charger has to be sold together with every device. Moreover, a charger can be easily forgotten somewhere during mobile use. The absence of the charger means that the battery-operated device can only be used as long as one charge lasts.

Another drawback of the prior-art systems is that the cooling output is very limited during operation of the battery according to the state of the art. The handheld device cited in European patent specification EP 1 178 557 B1, by virtue of its design, can only accommodate very small cooling fans.

It is an object of the present invention to provide an improved temperature control, especially a way to cool batteries.

The present invention provides a vacuum cleaner in which the vacuum cleaner comprises a vacuum generator that serves to generate an air stream along a certain flow path and the at least one battery or the at least one battery compartment is arranged in said flow path.

The present invention provides that a relatively strong vacuum generator can be used in order to control the temperature of the batteries. For the most part, a vacuum cleaner consists of a mobile base and a suction nozzle connected via a suction hose. Since the base normally does not have to be lifted off the floor, but rather is pulled along during the vacuuming procedure, the weight and size of a high-performance vacuum generator do not play as important a role as in the case of a purely handheld device. Therefore, the invention can also be seen to lie in the fact that the insight has been gained that a vacuum cleaner lends itself very well for effectively controlling the temperature of batteries.

At this juncture, it should be pointed out that any type of means into which a battery can be placed or inserted should be considered as a battery compartment within the scope of the invention. This can also be for purposes of transferring energy, so that this term also applies to, for example, charging docks or charging compartments.

Furthermore, it should be pointed that the expression "vacuum generators" refers to every type of flow-producing machine for gaseous media. This expression includes blowers, fans, ventilators and the like.

Advantageous embodiments and refinements of the invention ensue from the subordinate claims as well as from the description in conjunction with the figures.

It is advantageous if at least one battery or the at least one battery compartment is arranged in the flow path upstream from the vacuum generator. This accounts for the fact that the battery can be effectively cooled since the air directed to the battery is not heated up by the exhaust heat given off by the vacuum generator.

It is also advantageous if the at least one battery or the at least one battery compartment is arranged in the flow path downstream from the vacuum generator. In this manner, the exhaust heat given off by the vacuum generator can be utilized to warm up the battery, for instance, when the vacuum cleaner is operated at low temperatures.

Advantageously, the vacuum cleaner has a switch-over mechanism that is designed to connect the at least one battery or the at least one battery compartment to the vacuum generator on the suction side in a first switching position, and on the pressure side in a second switching position. In this manner, the battery can be optimally cooled as well as warmed up.

It is particularly advantageous if a suction opening that is designed to vacuum dirt is arranged in the flow path. In this variant, the vacuum generator is used to control the temperature of the battery as well as to vacuum dirt. The vacuum generator thus has a dual function, which is why the vacuum cleaner according to the invention can be produced very cost-effectively. Advantageously, the vacuum generator is formed by the suction fan of the vacuum cleaner which, as a rule, is a very high-performance fan, which is why the temperature of the battery can be controlled particularly effectively.

It is especially advantageous if the flow path comprises several branches and if the at least one battery and/or the at least one battery compartment is arranged in the flow path of at least one branch. With this measure, the air throughput through the battery compartment can be regulated independently of the air throughput through the suction or exhaust opening, for instance, by means of a control flap. Moreover, the branch of the flow path that runs through the battery compartment can be separated from the dirt-conducting branch.

In this context, it is particularly advantageous if the flow path on the suction side encompasses at least two branches, one branch being connected to the suction opening and the other one being connected to the at least one battery or to the at least one battery compartment. This makes it possible to vacuum dirt, especially dirty water, through one branch, and to draw in clean air through the other branch in order to control the temperature of the battery.

In an especially advantageous variant, the vacuum cleaner comprises a charger that is electrically connected to the at least one battery or to contacts in the at least one battery compartment. In this manner, the battery can be charged and its temperature can be optimally controlled right in the vacuum cleaner; as a rule, it is cooled during charging.

It is particularly advantageous if the charger is arranged in the flow path. With this measure, not only the battery but also the charger is cooled, often giving rise to relatively high currents.

The above-mentioned embodiments and refinements of the invention can be combined in any desired way.

BRIEF DESCRIPTION OF THE DRAWINGS

The present invention will be explained in greater detail below on the basis of the embodiments shown in the schematic figures of the drawing.

The following is shown.

DETAILED DESCRIPTION

Figure 1:
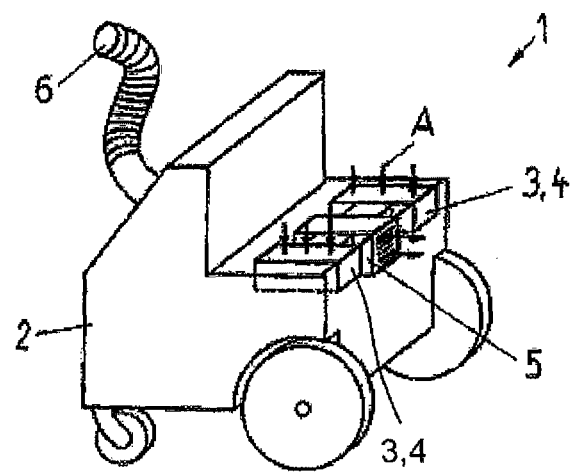
FIG. 1—a first example of a vacuum cleaner according to the invention.

In the figures of the drawing, identical or similar parts are designated with the same reference numerals, and elements or features having a similar function, unless otherwise indicated, are designated with the same reference numerals although with different indices.

FIG. 1 shows a vacuum cleaner 1 with a housing 2 and two battery compartments 3 that are arranged therein and that serve to hold batteries 4. The vacuum cleaner 1 also comprises a vacuum generator 5 that serves to generate an air stream along a flow path A, whereby the battery compartments 3 are arranged in the cited flow path A. FIG. 1 shows the housing 2 without the cover, so that the battery compartments 3 can be seen. As can be gleaned from FIG. 1, the vacuum generator 5 draws in air via the top of the battery compartments 3 and blows the air out of the back of the vacuum cleaner 1. In this manner, the batteries 4 inserted into the battery compartments 3 can be cooled during charging and discharging when they are hotter than the ambient temperature, or else warmed up so that they can perform optimally. The vacuum generator 5 in this embodiment is configured as a ventilation element that can be controlled separately and that is arranged between the two battery compartments 3.

In addition, the vacuum cleaner 1 comprises a suction hose 6 by means of which dust or dirt can be vacuumed in a known manner using another vacuum generator, for instance, a suction fan.

In the example shown, the battery compartments 3 are arranged in the flow path A upstream from the vacuum generator 5. This is particularly advantageous when the batteries 4 are supposed to be cooled. However, it would also be conceivable for the battery compartments 3 to be arranged in the flow path A downstream from the vacuum generator 5. This is particularly advantageous when the battery compartments 4 are supposed to be warmed up, for example, when the vacuum cleaner 1 is being used at low temperatures outdoors. The drawn-in air is then heated by the vacuum generator 5 and can thus better warm up the batteries 4 to an optimal operating temperature.

Optionally, the vacuum cleaner 1 can also be equipped with a switch-over mechanism that is designed to connect the batteries 4 or the battery compartments 3 to the vacuum generator 5 on the suction side in a first switching position, and on the pressure side in a second switching position. In this manner, the battery 4 can be optimally cooled or warmed up (in this context, also see FIG. 3).

Figure 2:
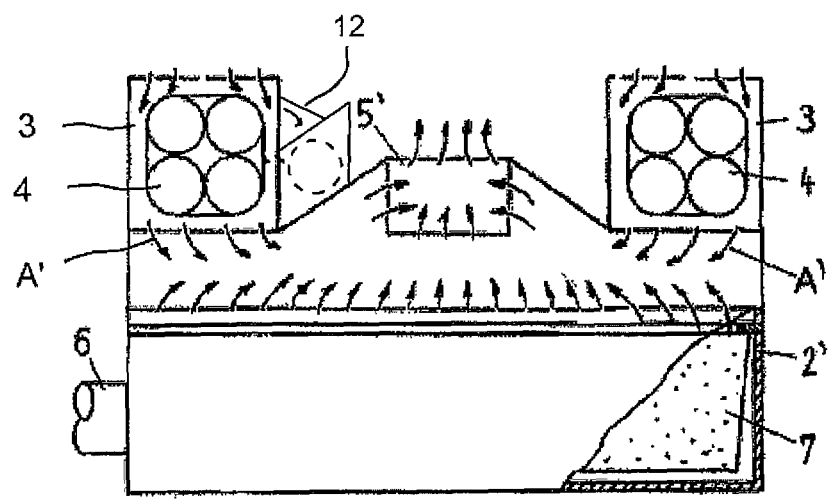
FIG. 2—a schematic cross section through an alternative embodiment of a vacuum cleaner in which a shared vacuum generator is provided for vacuuming dust and for controlling the temperature of the battery.

FIG. 2 then shows a section of a schematic depiction of an alternative embodiment of a vacuum cleaner according to the invention. Here, a vacuum generator 5' draws in air via the battery compartments 3 in order to cool the batteries 4 which, in the embodiment shown, consist of four cells each. At the same time, the vacuum generator 5', however, also draws in air via the suction hose 6 and the filter 7.

Therefore, on the suction side, the flow path A' comprises at least two branches, one branch being connected to the suction opening (here with the suction hose 6) that is designed to vacuum dirt, and the other one being connected to the batteries 4 or to the battery compartments 3. In this variant, the vacuum generator 5' thus has a dual function since it allows vacuuming as well as controlling the temperature of the batteries 4. Moreover, as a rule, the suction fans of a vacuum cleaner 1 are high-performance (about 1 to 2 kW) so that the temperature of the batteries 4 can be controlled very efficiently. In order to make it possible to regulate the air throughput through the several branches, it is also possible to provide flaps or slides that throttle the air throughput through individual branches.

As an alternative, it would be conceivable for the branch for the cooling of the batteries 4 as well as for the suction hose 6 to open up into the flow path A' upstream from the filter 7. In certain cases, this is structurally simpler than for this branch to open up downstream from the filter 7.

Figure 3:
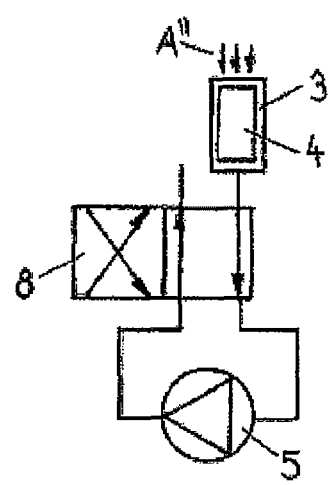
FIG. 3—an arrangement in which the battery can be connected to the vacuum generator either on the suction side or on the pressure side.

FIG. 3 shows a vacuum cleaner 1 having a switch-over mechanism 8 that serves to connect the at least one battery 4 or the at least one battery compartment 3 to the vacuum generator 5 on the suction side in a first switching position, and on the pressure side in a second switching position. FIG. 3 depicts the switching position in which the battery 4 or the battery compartment 3 is connected to the vacuum generator 5 on the suction side. The battery 4 can thus be cooled optimally. When the switch-over mechanism 8 is actuated, the battery 4 can be connected to the vacuum generator 5 on the pressure side, so that the battery 4 can be warmed up by the exhaust heat given off by the vacuum generator 5. The switch-over mechanism 8 can be configured, for instance, as a flap, slide, valve or the like.

The batteries 4 can be permanently installed in the vacuum cleaner 1 or else they can be removed from the battery compartment 3. In the latter case, the batteries 4 can also be used in other devices. For this reason, in an advantageous embodiment, the vacuum cleaner 1 also comprises a charger 12, shown schematically, that is electrically connected to at least one battery 4 or to contacts in the at least one battery compartment 3. Preferably, the charger is arranged in the flow path A, A', A", especially preferably adjacent to the battery 4 or to the battery compartment 3. The charger 12 then defines a further battery compartment of the housing, and battery compartment as defined herein is any section capable of holding a battery.

In the example shown, two batteries 4 can be inserted into the vacuum cleaner 1, where they are charged or where they can be used to operate the vacuum cleaner 1. It goes without saying that a vacuum cleaner 1 according to the invention can also comprise more than two battery compartments 3 or else just one battery compartment 3.

In conclusion, mention should be made of the fact that some of the figures are not drawn to scale and are also shown in highly simplified form. Consequently, a real vacuum cleaner 1 can have more components than shown here and thus be structured with greater complexity than shown in the figures. Moreover, parts of the arrangements depicted in the figures can also constitute the basis for independent inventions.

Finally, it should also be pointed out that the invention does not refer only to household vacuum cleaners, but rather, it applies generally to devices used to vacuum dirt, in other words, also to, for example, industrial vacuum cleaners (especially also for picking up liquids), leaf vacuum devices and the like.

Only two batteries or two battery compartments are shown in the depicted embodiments in order to elucidate the invention. However, the person skilled in the art can derive from the documentation provided that a vacuum cleaner according to the invention can also be configured so as to have an arrangement with just one battery or else with more than two batteries, The list of reference numerals that follows as well as the technical teachings of the patent claims are considered to fall within the scope of the disclosure and, either on their own or in combination with the figures, they disclose to the person skilled in the art additional details of the invention ands of its embodiments.

What is claimed is:

1. A vacuum cleaner comprising:
   a housing having at least one battery compartment for holding at least one battery;
   a vacuum generator generating an air stream along a flow path, the at least one battery compartment being arranged in the flow path; and
   a switch-over mechanism designed to connect the at least one battery compartment to the vacuum generator on the suction side in a first switching position, and on the pressure side in a second switching position.

2. The vacuum cleaner as recited in claim 1 further comprising the at least one battery, the at least one battery being arranged in the flow path.

3. The vacuum cleaner as recited in claim 1 wherein the at least one battery compartment is arranged in the flow path upstream from the vacuum generator.

4. The vacuum cleaner as recited in claim 1 wherein the at least one battery compartment is arranged in the flow path downstream from the vacuum generator.

5. The vacuum cleaner as recited in claim 1 wherein a suction opening designed to vacuum dirt is arranged in the flow path.

6. The vacuum cleaner as recited in claim 1 wherein the flow path comprises several branches and the at least one battery compartment is arranged in the flow path of at least one branch.

7. The vacuum cleaner as recited in claim 6 wherein the flow path on the suction side encompasses at least two branches, and one branch is connected to the suction opening while the other is connected to the at least one battery compartment.

8. The vacuum cleaner as recited in claim 1 wherein the at least one battery compartment includes a charger electrically connected to at least one battery or to contacts in the at least one battery compartment.

9. The vacuum cleaner as recited in claim 8 wherein the charger is arranged in the flow path.

* * * * *